(12) United States Patent  
Wians (10) Patent No.: US 7,070,035 B2
(45) Date of Patent: Jul. 4, 2006

(54) TWO-WAY COUPLING APPARATUS AND METHOD

(75) Inventor: Jeffrey A. Wians, Mebane, NC (US)

(73) Assignee: Honda Motor Co., Ltd., Tokyo (JP)

( * ) Notice: Subject to any disclaimer, the term of this patent is extended or adjusted under 35 U.S.C. 154(b) by 496 days.

(21) Appl. No.: 10/402,607

(22) Filed: Mar. 28, 2003

(65) Prior Publication Data

US 2004/0188219 A1  Sep. 30, 2004

(51) Int. Cl.
*F16D 23/10* (2006.01)

(52) U.S. Cl. .................. 192/105 CD; 192/46
(58) Field of Classification Search ............. 192/45, 192/46, 105 CD
See application file for complete search history.

(56) References Cited

U.S. PATENT DOCUMENTS

| | | | | |
|---|---|---|---|---|
| 688,644 | A | * | 12/1901 | Houghtaling ............... 192/46 |
| 2,308,926 | A | * | 1/1943 | Kreis ......................... 192/46 |
| 2,340,368 | A | * | 2/1944 | Dodge ................ 192/105 CD |
| 3,093,226 | A | * | 6/1963 | Basebe et al. ............. 192/69.3 |
| 4,049,099 | A | * | 9/1977 | Zeigler ....................... 192/46 |
| 4,159,614 | A | | 7/1979 | Thomas et al. |
| 4,689,939 | A | | 9/1987 | Seyerle |
| 4,811,552 | A | | 3/1989 | Fujimoto |
| 4,896,487 | A | | 1/1990 | Hikishima et al. |
| 4,915,203 | A | | 4/1990 | Schweitz et al. |
| 5,251,711 | A | | 10/1993 | Meyer et al. |
| 5,353,578 | A | | 10/1994 | Irby et al. |
| 5,718,109 | A | | 2/1998 | Fujita |
| 6,475,109 | B1 | | 11/2002 | Blanchard |
| 2002/0178708 | A1 | | 12/2002 | Williams et al. |
| 2002/0183145 | A1 | | 12/2002 | Blanchard |

* cited by examiner

*Primary Examiner*—Saul Rodriguez
(74) *Attorney, Agent, or Firm*—Jenkins, Wilson, Taylor & Hunt, P.A.

(57) ABSTRACT

A centrifugally actuated coupling apparatus having an internal hub, an annular rotatable external hub coaxially disposed about the internal hub, and a locking element. The internal hub is rotatable about an axis, and includes an outer circumferential surface and a first recess formed on the outer surface. The external hub includes an inner circumferential surface and at least one circumferentially spaced second recess formed on the inner surface. The locking element includes a pivot end and a contact end. The pivot end is pivotally retained by the internal hub, and the contact end movably contacts the first recess. The contact end is pivotable radially outwardly by centrifugal force into engagement with one of the second recesses in response to rotation of the internal hub in a forward direction with respect to the external hub.

41 Claims, 4 Drawing Sheets

TWO-WAY COUPLING APPARATUS AND METHOD

TECHNICAL FIELD

The present invention is generally directed to coupling devices for use in selectively transmitting rotational power (e.g., torque) from a rotating input component to a rotating output component. More particularly, the present invention is directed to a coupling apparatus and method that when de-coupled permits rotation of the output component in both the forward and reverse directions.

BACKGROUND ART

Mechanical couplers such as clutches are used in a wide variety of applications to selectively connect and disconnect a driving mechanism to and from a driven mechanism. Typical uses include automotive applications such as vehicular transmissions and self-propelled applications such as riding or walk-behind lawn mowers and other mobile powered equipment. The driving mechanism supplies input power and the driven mechanism receives the input power to provide an output response. When a clutch is positioned in a coupled state, its associated driving mechanism is mechanically referenced to the corresponding driven mechanism so that the power supplied by the driving mechanism is transmitted to the driven mechanism. For example, the driving mechanism can constitute or be connected to the output shaft of a motor, and the driven mechanism can constitute a wheel, a cam mechanism, or some other component that rotates or reciprocates. In one common clutch design, the coupling between the driving and driven mechanisms is accomplished by way of friction. For example, a spinning plate connected to a power input can be brought into frictional contact with another plate to cause the other plate to spin. In another common design, the coupling is accomplished by way of a pawl, dog, tooth, pin or catch that brings the driving mechanism into positive engagement with the driven mechanism. Coupling apparatus are examples of this latter design.

As known to persons skilled in the art, a self-propelled lawnmower is designed to utilize the rotational power developed by its motor both for powering its cutting blades and for selectively powering one or more of its wheels through a suitable transmission assembly. Accordingly, self-propelled lawnmowers often include one or more types of clutches. Most self-propelled lawnmowers utilize an on/off clutch of varying design inside the transmission assembly, as well as a 1-way ratchet disposed at the wheel area external to the transmission assembly. The operator of the lawnmower utilizes a cable to engage and disengage the internal transmission clutch and thus control whether or not power from the motor is transmitted to the wheel or wheels. When disengaged, the internal transmission clutch allows the lawnmower to be rolled backward. Due to the design of the internal transmission clutch, the 1-way ratchet is needed between the output of the transmission assembly and the wheels to enable the lawnmower to be rolled forward when the motor power is de-coupled from the wheels. Typically, an additional cable is utilized to control driving speed.

In some recent lawnmower designs, a conventional internal transmission clutch is not needed. For example, on/off drive control can be implemented by employing a belt to disengage a clutch, and speed is controlled by a variable-pitch pulley. In such a case, one cable can be used both for controlling the clutch and for varying the driving speed. While in this case the internal transmission clutch is not needed, it nonetheless would be desirable to provide a means for enabling the lawnmower to be rolled forward and backward when power from the motor is not being transmitted to the wheels. It would therefore be advantageous to provide a 2-way or bi-directional clutch that not only selectively transmits power from a driving mechanism to a driven mechanism, but also permits the driven mechanism, such as wheels for example, to be freely rotated in both the forward and reverse directions when the clutch is disengaged.

A clutch that permits freewheeling in both directions when disengaged is disclosed in U.S. Pat. No. 4,909,365 to Tillotson et al. The driving member of this clutch is an output shaft in which a keyway is formed. The output shaft is supported through the aperture of a housing. The driven member of the clutch is a pinion gear that is supported on the output shaft and includes several keyways spaced at 1 EH-degree intervals. In addition, a friction disk is supported on the output shaft and is located between the pinion gear and a wall of the housing. A key is supported both by the keyway of the output shaft and by a relief formed in the friction disk. An axially oriented thrust spring biases the pinion gear into contact with the friction disk, and thus pushes the friction disk against the housing. To engage the clutch, the output shaft is rotated. This rotation of the output shaft causes the key to rotate around the shaft and the friction disk to bear on the key. Once the keyway of the output shaft becomes aligned with one of the keyways of the pinion gear, the friction disk forces a portion of the key into the keyway of the pinion gear, thereby driving the pinion gear. As described in the patent, the frictional load produced by friction disk is needed to engage the clutch.

Another clutch that permits bi-directional freewheeling is disclosed in U.S. Pat. No. 5,307,911 to Robinson. This clutch consists of a central drive shaft, a concentrically disposed output shaft, and an annular clutch assembly between the drive shaft and the output shaft. In addition, the drive shaft is coaxially disposed about a fixed stub shaft. A portion of the drive shaft is octagon-shaped, with its outer surface consisting of eight flat chord sections. The clutch assembly consists of an annular ring of eight roller bearings joined together by a cage. Each roller bearing is positioned on one of the chord sections of the drive shaft. An annular friction band is coaxially disposed about the stub shaft. The friction band is disposed between the stub shaft and the cage of the roller bearings, and contacts both the stub shaft and the cage. As the drive shaft rotates, each roller bearing moves into an extreme position between its corresponding chord section and the inside surface of the output shaft. The friction band is needed in order to impart friction to the roller bearings so as to hold the roller bearings in their respective extreme positions. As a result, the drive shaft drives the output shaft. In order to stabilize this clutch, four distinct sets of bearings are required in addition to the bearings disposed on the chord sections.

Clutches of the type disclosed in U.S. Pat. Nos. 4,909,365 and 5,307,911 in which engagement requires the development of friction use several components that, in operation, are subjected to large amounts of heat energy and impact, and hence are prone to wearing, loss of material, and failure. It would therefore be advantageous to provide a 2-way or bi-directional clutch that does not rely on frictional contact for engagement, and thus is less prone to premature wear and failure in comparison with previous clutch designs.

SUMMARY

A coupling apparatus and method are disclosed for connection to a rotational input component and a rotational output component. The coupling device can be de-coupled so as to permit rotation of the output component in both forward and reverse directions. In a preferred embodiment, a ratchet-type coupling apparatus is disclosed that can be engaged by positive contact in response to actuating a locking component by centrifugal force. The locking component provides an interface between a driving member and a driven member. Suitable rotation of the driving member can cause the locking component to be thrown outwardly and into engagement with the driven member. Once engaged, the driven member rotates with the driving member. Losses associated with friction are minimal. The coupling apparatus can be used, for example, as a clutch in a variety of applications.

According to one embodiment, a centrifugally actuated coupling apparatus comprises an internal hub rotatable about an axis, an annular rotatable external hub coaxially disposed about the internal hub, and a locking element. The internal hub comprises an outer circumferential surface and a first recess formed on the outer surface. The external hub comprises an inner circumferential surface and a plurality of circumferentially spaced second recesses formed on the inner surface. The locking element comprises a pivot end and a contact end. The pivot end is pivotally retained by the internal hub. The contact end movably contacts the first recess. The contact end is pivotable radially outwardly by centrifugal force into engagement with one of the second recesses in response to rotation of the internal hub in a forward direction with respect to the external hub.

According to another embodiment, the locking element comprises a pivot end, a locking element axis, and a contact element rotatable about the locking element axis.

According to yet another embodiment, the internal hub comprises a first recess formed on the outer surface and a pivot section spaced from the first recess. The pivot end of the locking element is pivotally retained by the internal hub at the pivot section.

According to still another embodiment, the contact end of the locking element comprises opposing free-standing side surfaces joined by an outer contact surface. The outer contact surface movably contacts the first recess formed on the internal hub. The outer contact surface is pivotable radially outwardly into engagement with one of the second recesses in response to rotation of the internal hub in a forward direction with respect to the external hub.

According to a further embodiment, the locking element comprises a pivot end and a contact end. The pivot end is pivotally retained by the internal hub. The contact end is radially pivotable from a de-coupled position to a coupled position in response to rotation of the internal hub in a forward direction with respect to the external hub. In the de-coupled position, the contact end contacts the first recess of the internal hub and permits the external hub to rotate in the forward direction and in a reverse direction with respect to the internal hub. As the contact end is pivoted to the coupled position, the contact end rolls into engagement with one of the second recesses of the external hub to enable the internal hub to drive the external hub in the forward direction.

A method is also provided for selectively transmitting torque from a first rotatable member to a second rotatable member. A coupling device is provided that comprises the first rotatable member, the second rotatable member, and a catch mechanism. The second rotatable member is disposed in coaxial relation to the first rotatable member. The first rotatable member comprises an outer circumferential surface and a first recess formed on the outer surface. The second rotatable member comprises an inner circumferential surface and a plurality of second recesses formed on the inner surface. The catch mechanism is pivotally retained by the first rotatable member and comprises a contact end movable along the first recess during pivoting of the catch mechanism. The first rotatable member is locked into mechanical communication with the second rotatable member by rotating the first rotatable member in a first direction. This causes the contact end to pivot radially outwardly into seating engagement with one of the second recesses. Further rotation of the first rotatable member rotates the second rotatable member in the first direction.

According to one aspect of this method, rotation of the first rotatable member in the first direction drives the contact end of the catch mechanism into contact with the inner surface of the second rotatable member, and causes the contact end to move along the inner surface and into engagement with the second recess of the second rotatable member. According to another aspect of this method, the contact end of the catch mechanism maintains contact with the first recess of the first rotatable member while engaging the second recess of the second rotatable member to assist in retaining the contact end in seating engagement with the second recess during rotation of the first rotatable member in the first direction.

Therefore, it is an object to provide a novel coupling device and method for coupling an input component to an output component which, when de-coupled, permits free rotation of the output component in both the forward and reverse directions.

An object of the invention having been stated hereinabove, and which is achieved in whole or in part by the invention disclosed herein, other objects will become evident as the description proceeds, when taken in connection with the accompanying drawings as best described hereinbelow.

DETAILED DESCRIPTION OF THE INVENTION

Figure 1A:
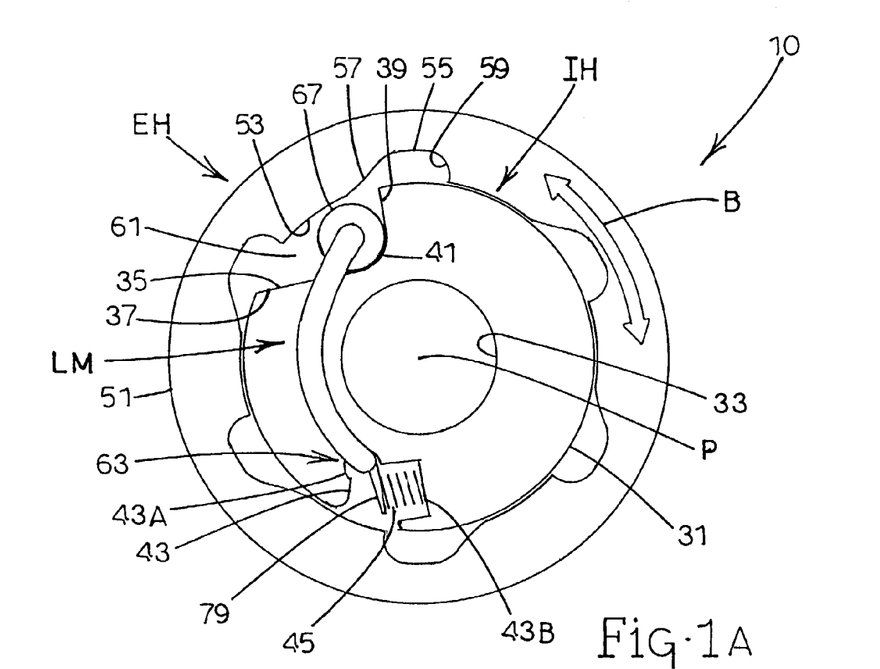
FIG. 1A is a side elevation view of a coupling apparatus illustrating the coupling apparatus in a de-coupled state.
Figure 1B:
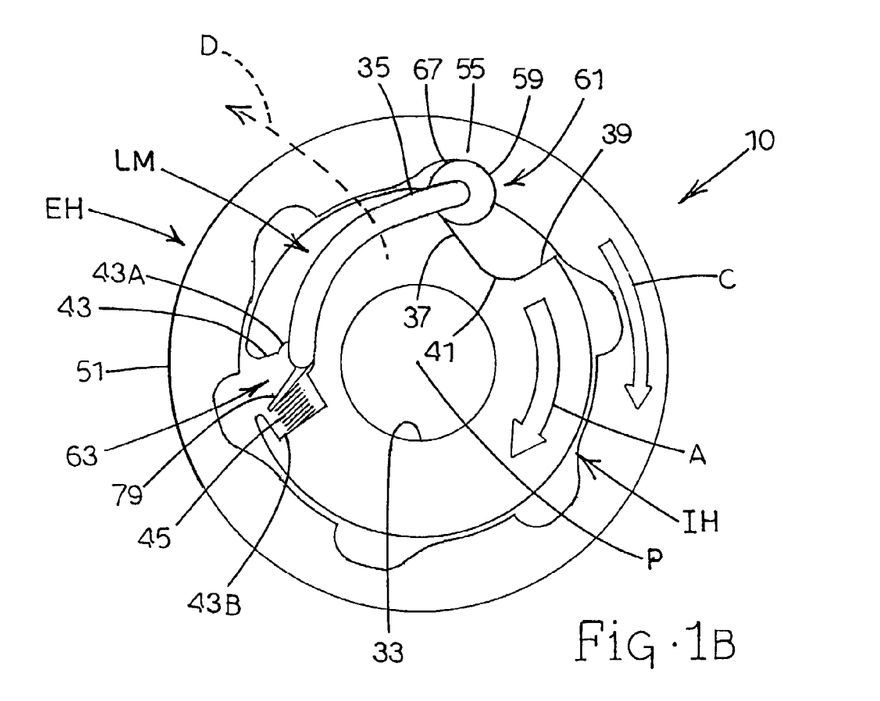
FIG. 1B is a side elevation view illustrating the coupling apparatus in a coupled state.

Referring now to FIGS. 1A and 1B, a coupling apparatus is shown in a preferred embodiment generally designated 10. Coupling apparatus 10 comprises an internal hub generally designated IH; an external hub generally designated EH; and a locking or catch mechanism, generally designated LM. Coupling apparatus 10 is movable between a de-coupled or disengaged state and a coupled or engaged state. FIG. 1A illustrates the de-coupled state in which internal hub IH and external hub EH are not mechanically connected to each other. FIG. 1B illustrates the coupled state in which internal hub IH and external hub EH are connected to each other by means of locking mechanism LM, as described in more detail below.

Internal hub IH rotates about a central axis, represented by a point P in FIGS. 1A and 1B. In certain embodiments of the invention, internal hub IH is mated to a powered input shaft that rotates only in one direction, represented by arrow A in FIG. 1B. The sense of directional arrow A has been arbitrarily depicted to be clockwise but could alternatively be counterclockwise. As a result, internal hub IH likewise is rotatable only in the same direction. Typically, in a case where external hub EH is mated to or otherwise mechanically communicates with a wheel, such as the wheel of a lawnmower, this direction is a forward direction resulting in the lawnmower being driven to the right from the perspective of FIGS. 1A and 1B. External hub EH is coaxially disposed around internal hub IH, and hence is also rotatable about central axis P. As described below, external hub EH is freely rotatable in both the forward and reverse directions when coupling apparatus 10 is in its de-coupled state as represented by arrow B in FIG. 1A, and is driven to rotate in the same direction as internal hub IH when coupling apparatus 10 is in its coupled state as represented by arrow C in FIG. 1B.

Internal hub IH is illustrated as having an annular configuration, and thus preferably has a cylindrical outer surface 31 and a cylindrical inner surface 33. Inner surface 33 forms a bore through which a shaft could extend if desired. Inner surface 33 is depicted as being circular but could have any shape as dictated, for example, by the cross-sectional shape of a shaft extending therethrough. Alternatively, internal hub IH could take the form of a solid disk without a bore through its central region. The choice between providing internal hub IH as either an annulus or a solid disk will depend on the particular application contemplated for coupling apparatus 10. As described below, in one advantageous embodiment of the invention, internal hub IH is adapted for supporting locking mechanism LM in a manner that enables locking mechanism LM to be pivoted radially outwardly with respect to central axis P. For this purpose, a recess 35 is formed in the body of internal hub IH. Preferably, recess 35 is at least generally L-shaped and defined by a first edge or surface 37 and a second edge or surface 39, each of which extend into the body of internal hub IH from its outer surface 31. First and second edges 37 and 39 are joined together by a smooth shoulder region 41. In addition, a mounting area 43 is formed in internal hub IH to support one end of locking mechanism LM. The design of mounting area 43 will depend on the design of locking mechanism LM. In FIGS. 1A and 1B, mounting area 43 is a recess 35 cut into the body of internal hub IH. Alternatively, mounting area 43 could be a through-bore or a pair of blind bores on either side of internal hub IH. Mounting area 43 also accommodates a spring 45, the function of which is described below.

External hub EH has an annular cross-section to accommodate its coaxial position in relation to internal hub IH, and thus has a cylindrical outer surface 51 and a cylindrical inner surface 53. A number of circumferentially spaced recesses 55 are formed into the body of external hub EH from its inner surface 53. Each recess 55 is preceded by an angled cam surface 57 to provide a smooth, guiding transition from a corresponding portion of inner surface 53 to recess 55. In addition, each recess 55 has an arcuate region 59. The respective functions of recesses 55 and cam surfaces 57 of external hub EH are described below.

The invention is not limited to any specific dimensions of internal hub IH and external hub EH. Typically, internal hub IH can have an inside diameter ranging from approximately 19 mm to approximately 300 mm.

Figure 2:
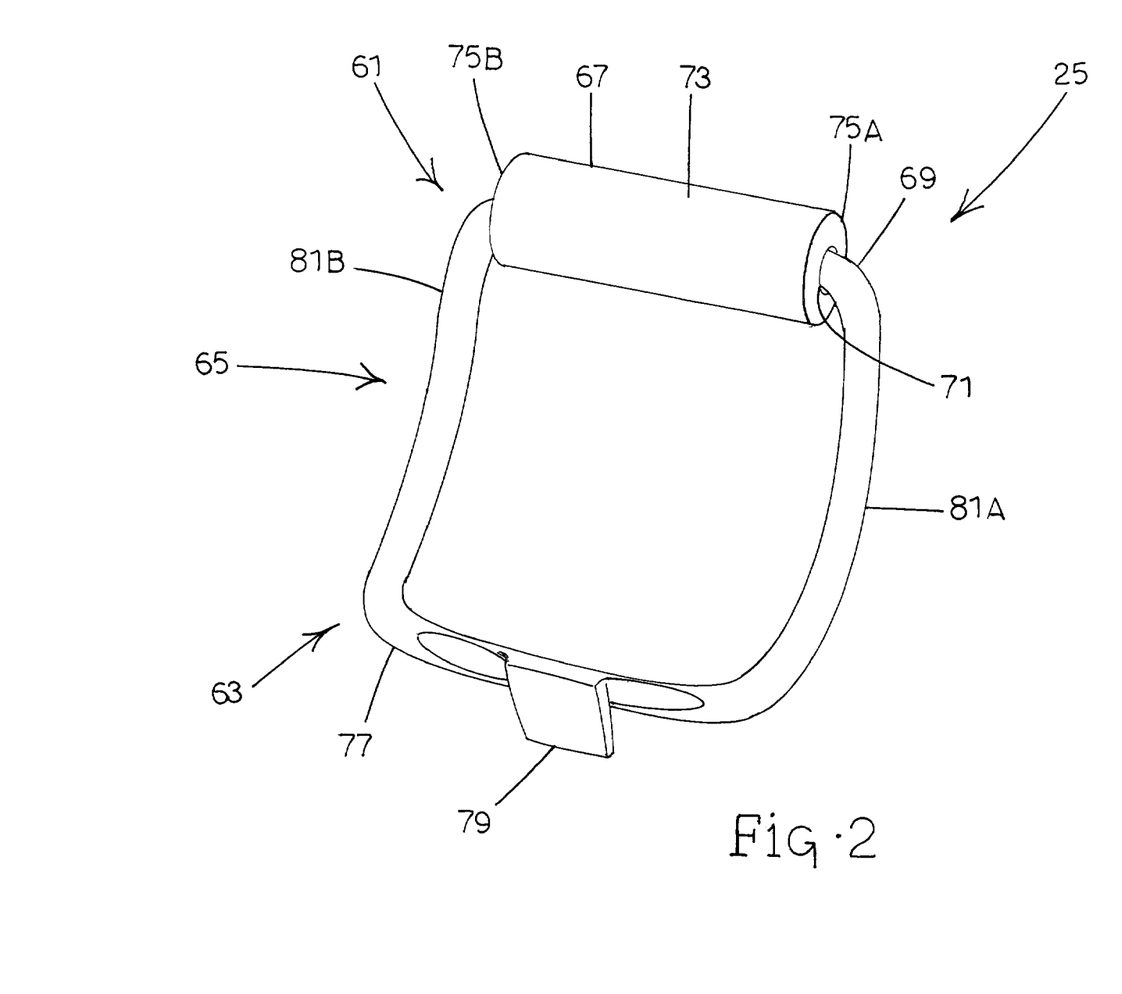
FIG. 2 is a perspective view of a locking mechanism provided with the coupling apparatus.

Referring now to FIG. 2, a preferred embodiment of locking mechanism LM is illustrated. In broad terms, locking mechanism LM comprises a contact end or portion, generally designated 61; a end or pivot portion, generally designated 63; and a lever portion, generally designated 65, interconnecting the contact and pivot portions 61 and 63. As shown in FIGS. 1A and 1B, contact portion 61 is adapted for movable contact with recess 35 of internal hub IH. Thus, contact portion 61 preferably comprises a hollow cylindrical element such as a roller pin 67 that is rotatable about a suitable contact end axis such as a front arm 69. Front arm 69 can be continuous throughout an internal bore 71 of roller pin 67, or can terminate at opposing ends disposed within internal bore 71. Roller pin 67 comprises an outer contact surface 73 joined by two opposing, free-standing side surfaces 75A and 75B. The term "free-standing" is used to mean that side surfaces 75A and 75B are not restricted in any manner and are not required to, and preferably do not, contact any other surface or component during the pivoting or actuating of locking mechanism LM described below. This feature allows roller pin 67 to freely rotate about front arm 69 and to be freely translated through an arcuate path solely by centrifugal force and not by frictional contact with another component. By this free-standing configuration, wear on locking mechanism LM is reduced and the useful life of coupling apparatus 10 is extended. Pivot portion 63 comprises a rear arm 77 and preferably a tab 79 to provide a sufficiently sized contact area for spring 45 (see FIGS. 1A and 1B). Lever portion 65 comprises two side arms 81A and 81B joined between front arm 69 and rear arm 77. Preferably, side arms 81A and 81B are arcuate to accommodate the retention of locking mechanism LM between recess 35 and mounting area 43 of internal hub IH (see FIGS. 1A and 1B) during rotation of internal hub IH.

In an alternative embodiment, locking mechanism LM can be provided as an integral one-piece structure. In this alternative embodiment, roller pin 67 is not rotatable about front arm 69, but instead takes the form of a protruding component of similar dimensions that is integral with front arm 69. In this case, the integral component substituted for roller pin 67 has a low-friction surface such as to be able to slide rather than roll along surfaces it contacts.

Referring back to FIGS. 1A and 1B, in the assembly of coupling apparatus 10, pivot portion 63 of locking mechanism LM is retained in an arcuate section 43A of mounting area 43 to define a pivot point about which contact portion 61 can rotate clockwise and counterclockwise. Spring 45 is inserted in mounting area 43 such that spring 45 is interposed between a base surface 43B of mounting area 43 and tab 79 of locking mechanism LM. Contact portion 61 of locking mechanism LM is disposed in recess 35 of internal hub IH, with roller pin 67 in movable contact with first edge 37 of recess 35. Spring 45 biases locking mechanism LM to pivot in the clockwise direction. In the de-coupled state of coupling apparatus 10 shown in FIG. 1A, spring 45 biases roller pin 67 into contact with shoulder region 41, first edge 37 and/or second edge 39 of recess 35. The biasing force of spring 45 is sufficient to overcome any effect of gravity on locking mechanism LM while coupling apparatus 10 is in the de-coupled state. That is, if internal hub IH were oriented in the de-coupled state such that roller pin 67 faced the lower half of inner surface 53 of external hub EH, the biasing force imparted by spring 45 would be sufficient to retain roller pin 67 in contact with a surface of recess 35 of internal hub IH. In this manner, locking mechanism LM is prevented from falling into engagement with a surface of one of recesses 55 of external hub EH and thereby coupling internal hub IH to external hub EH at an unintended time.

The operation of coupling apparatus 10 will now be generally described with reference to FIGS. 1A and 1B. For purposes of explanation, some aspects of the operation will be described in the context of a lawnmower, although it will be understood that coupling apparatus 10 can be utilized outside of such context in accordance with the broad teachings of the invention.

In the de-coupled state shown in FIG. 1A, internal hub IH is not positively connected to a power source such as a motor, and therefore does not rotate under the influence of torque. In an implementation where coupling apparatus 10 provides an interface between a motor and one or more wheels 137A and 137B of a lawnmower, a separate clutch or other means could be used to disconnect the torque produced by the motor from internal hub IH, as can be readily appreciated by persons skilled in the art. During this de-coupled state, no force is provided to actuate locking mechanism LM, and thus contact portion 61 and its roller pin 67 are retained in recess 35 of internal hub IH at the retracted position shown in FIG. 1A. As described previously, spring 45 mechanically assists in maintaining locking mechanism LM in the retracted position. In the retracted position, the radial distance of any point on contact portion 61 (see FIG. 2) of roller pin 67 from central axis P is less than the radial distance of outer surface 31 of internal hub IH from central axis P. Accordingly, locking mechanism LM does not interfere with any movement of external hub EH with respect to internal hub IH, and thus internal hub IH is free to rotate in either the forward or reverse directions as indicated by arrow B in FIG. 1A. In an implementation where external hub EH is connected to a wheel or wheels of a lawnmower, the de-coupled state permits the operator of the lawnmower to manually roll the lawnmower backwards and forwards as desired while the torque generated by the motor is disconnected from internal hub IH.

To actuate locking mechanism LM into the coupled state shown in FIG. 1B, internal hub IH is rotated in the forward direction indicated by arrow A under the influence of an applied driving force. Continuing with the example of a lawnmower implementation, the force applied to internal hub IH could be the result of the operator actuating a clutch or other coupling mechanism to couple the motor to internal hub IH and thereby transfer torque to internal hub IH. As internal hub IH rotates, internal hub IH imparts a centrifugal force to locking mechanism LM. The mass of roller pin 67 is sufficient to ensure that, under typical rotational driving speeds of internal hub IH, the centrifugal force is of a great enough magnitude to overcome the biasing force imparted by spring 45. As a result, roller pin 67 is pivoted radially outwardly through an arcuate path toward inner surface 53 of external hub EH. The sense of this arcuate path is in effect opposite to the forward direction in which internal hub IH rotates. Hence, in the example shown in FIG. 1B, the arcuate path is clockwise as indicated by an arrow D. Preferably, the size of roller pin 67, and the dimensions and curvature of side arms 81A and 81B of locking mechanism LM, are selected such that roller pin 67 maintains contact with and rolls along first edge 37 of recess 35 of internal hub IH during actuation of locking mechanism LM and concomitant switching of coupling apparatus 10 from the de-coupled state to the coupled state. This contact assists in stabilizing roller pin 67 during the centrifugally induced actuation.

It can be seen that as roller pin 67 is thrown outwardly during the initiation of forward rotation of internal hub IH, roller pin 67 will quickly come into contact with inner surface 53 of external hub EH while maintaining contact with a surface of recess 35 of internal hub IH such as first edge 37. However, roller pin 67 is free to rotate about front arm 69 of locking mechanism LM (see FIG. 2) while internal hub IH rotates. Thus, as forward rotation of internal hub IH proceeds, roller pin 67 rolls along both inner surface 53 of external hub EH and first edge 37 of recess 35 of internal hub IH. As the inside diameter of inner surface 53 of external hub EH transitions to the first available cam surface 57, the angled profile of cam surface 57 permits further outward pivoting of locking mechanism LM to smoothly guide roller pin 67 into recess 55 associated with that cam surface 57. As shown in FIG. 1B, actuation of locking mechanism LM continues until roller pin 67 becomes effectively seated in contact with arcuate region 59 of recess 55. To maximize contact between roller pin 67 and arcuate region 59, the profile of arcuate region 59 substantially conforms to the shape of outer contact surface 73 of roller pin 67. To assist in retaining roller pin 67 in seating engagement with arcuate region 59 of recess 55 of external hub EH while coupling apparatus 10 is in its fully coupled state shown in FIG. 1B, contact between roller pin 67 and first edge 37 of recess 35 of internal hub IH is maintained such that roller pin 67 is positioned in contacting engagement with a surface of recess 35 of internal hub IH and a surface of recess 55 of external hub EH.

Once locking mechanism LM has been locked into engagement with recess 55 of external hub EH, thereby providing a direct mechanical connection between internal hub IH and external hub EH, continued forward rotation of internal hub IH at a given drive speed likewise drives external hub EH to rotate in the forward direction, as depicted by arrow C in FIG. 1B. This coupling relation between internal hub IH and external hub EH enables the torque supplied by internal hub IH to be transmitted to external hub EH as output power O (see, for example, FIGS. 3 or 4) to positively drive any component, such as, for example, a wheel, gear, or output shaft, connected to external hub EH. It will be noted that, because external hub EH has a greater diameter than internal hub IH in the present embodiment, the driven speed of external hub EH at its outermost surface 51 will be proportional to the drive speed of internal hub IH at its outermost surface 31. For the purpose of the present disclosure, however, the radial distances of rotating bodies do not need to be considered, and therefore no distinction is made herein between frequency and angular velocity.

The coupled state is maintained as long as internal hub IH is rotated in the forward direction at a drive speed proportionally greater than the driven speed of external hub EH. Once the torque transferred to internal hub IH is removed, such as by an operator disengaging internal hub IH from the output of a motor, no force exists to oppose the biasing force stored in spring 45. Thus, any subsequent jogging or other movement of external hub EH of sufficient magnitude in the forward direction with respect to internal hub IH will cause locking mechanism LM to be returned to its retracted state shown in FIG. 1A. This retraction is assisted with the use of one of cam surfaces 57.

It will also be noted that coupling apparatus 10 permits external hub EH to overrun internal hub IH in the forward direction while in the coupled state without detrimentally affecting the operation of coupling apparatus 10. That is, external hub EH can rotate in the forward direction at a coasting speed proportionately greater than the drive speed at which internal hub IH is rotating. In the case of a lawnmower, an overrun condition can occur, for instance, by the operator manually pushing the lawnmower forwardly faster than the speed at which lawnmower is propelled by the torque transmitted to its wheels through coupling apparatus 10, or by the operator allowing the lawnmower to roll down an incline faster than the speed at which the lawnmower is driven by the powered propulsion. Referring to FIG. 1B, the overrun condition is facilitated by cam surface 57 associated with recess 55 of external hub EH in which roller pin 67 is seated. As external hub EH rotates in the forward direction proportionately faster than internal hub IH, roller pin 67 in effect backs out of recess 55 of external hub EH and rolls along its associated cam surface 57. Cam surface 57 forces roller pin 67 to pivot inwardly, and guides roller pin 67 into contact with inner surface 53 of external hub EH. Roller pin 67 eventually encounters the preceding recess 55 of external hub EH, and is indexed along additional recesses 55, cam surfaces 57, and inner surface portions 53 until external hub EH slows down enough to permit the continued forward rotation of internal hub IH to actuate roller pin 67 back into locking engagement with one of recesses 55 of external hub EH.

Figure 3:
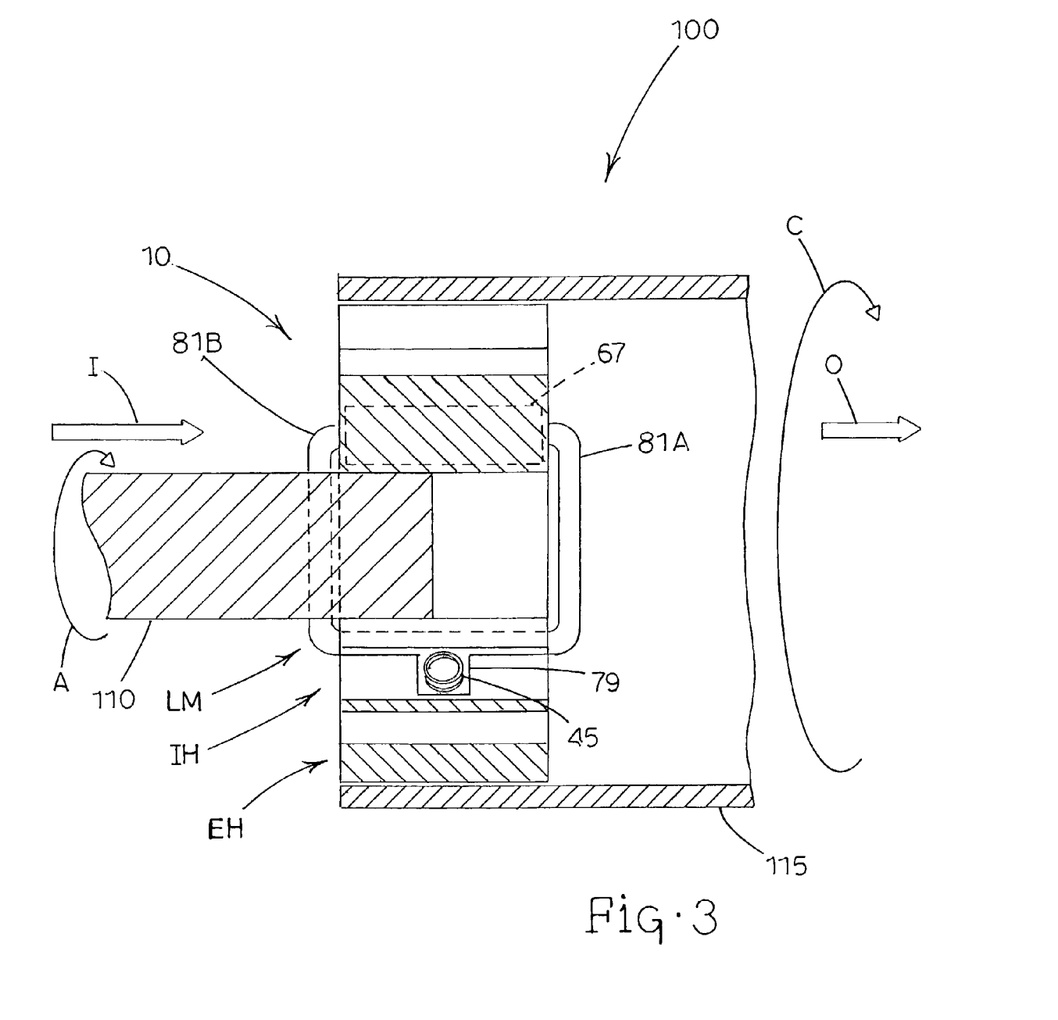
FIG. 3 is a cutaway cross-sectional view of a portion of a powered apparatus in which the coupling apparatus can be operatively installed.

Referring now to the cross-sectional view of FIG. 3, coupling apparatus 10 is illustrated as part of a powered apparatus or system, generally designated 100, which can be a motor-powered lawnmower, vehicle, or any other suitable machinery in which the selective transfer of rotational power is advantageous. Accordingly, coupling apparatus 10 can be selectively coupled between a rotatable input component 110 adapted for delivering input rotational power I to coupling apparatus 10 and a rotatable output component 115 adapted for receiving output rotational power O transmitted through coupling apparatus 10 while in the coupled state. More particularly, internal hub IH is mechanically coupled to input component 110, and external hub EH is mechanically coupled to output component 115. The mechanical coupling means utilized will depend in part on the types of input and output components employed in powered apparatus 100, the operational range of rotational speed, as well as the magnitudes and types of forces expected to be encountered for a given implementation of powered apparatus 100. Hence, the coupling means between corresponding hubs IH and EH and rotatable components 110 and 115 could be any suitable means known to persons skilled in the art. Non-limiting examples include press-fitting (as illustrated in FIG. 3), welding, keys, set screws, bolts, cotter pins, and the like. Moreover, for the purpose of exemplification only and not as a limitation, input component 110 and output component 115 are illustrated as being shafts coupled to internal hub IH and external hub EH, respectively. Input component 110 and output component 115 could be, however, any rotatable element known to persons skilled in the art, such as gears, sheaves, pulleys, flywheels, windings, bearings, joints, and the like.

With continuing reference to FIG. 3, the operation of coupling apparatus 10 when installed in any equipment such as powered apparatus 100 is analogous to the operation described above with reference to FIGS. 1A and 1B. When input component 110 is not subjected to powered rotation, internal hub IH is non-active and coupling apparatus 10 is in its de-coupled state. Thus, in the de-coupled state, no power is transmitted to output component 115. At the same time, however, output component 115 is free to rotate or coast in either the forward or reverse directions as described above. If output component 115 were connected to the wheel or wheels of a lawnmower, this de-coupled state would advantageously allow the operator to manually roll the lawnmower back and forth without having to overcome significant mechanical resistance. Coupling apparatus 10 is switched to its coupled state by coupling input component 110 with a suitable source of torque such as a motor. Rotation of input component 110 in the forward direction (arbitrarily represented again by arrow A) likewise rotates internal hub IH in the same forward direction, and actuates locking mechanism LM into seating engagement with external hub EH. As a result, external hub EH is driven to rotate in the forward direction (arrow C) at an output speed proportional to the input speed of internal hub IH. It will be noted that since locking mechanism LM couples internal hub IH to external hub EH by positive contact as opposed to frictional contact, there is very little heat loss and, consequently, the magnitude of output power delivered to output component 115 is not significantly attenuated in comparison to input power supplied from input component 110. Thus, coupling apparatus 10 can serve as an efficient coupling mechanism in a wide variety of implementations.

Figure 4:
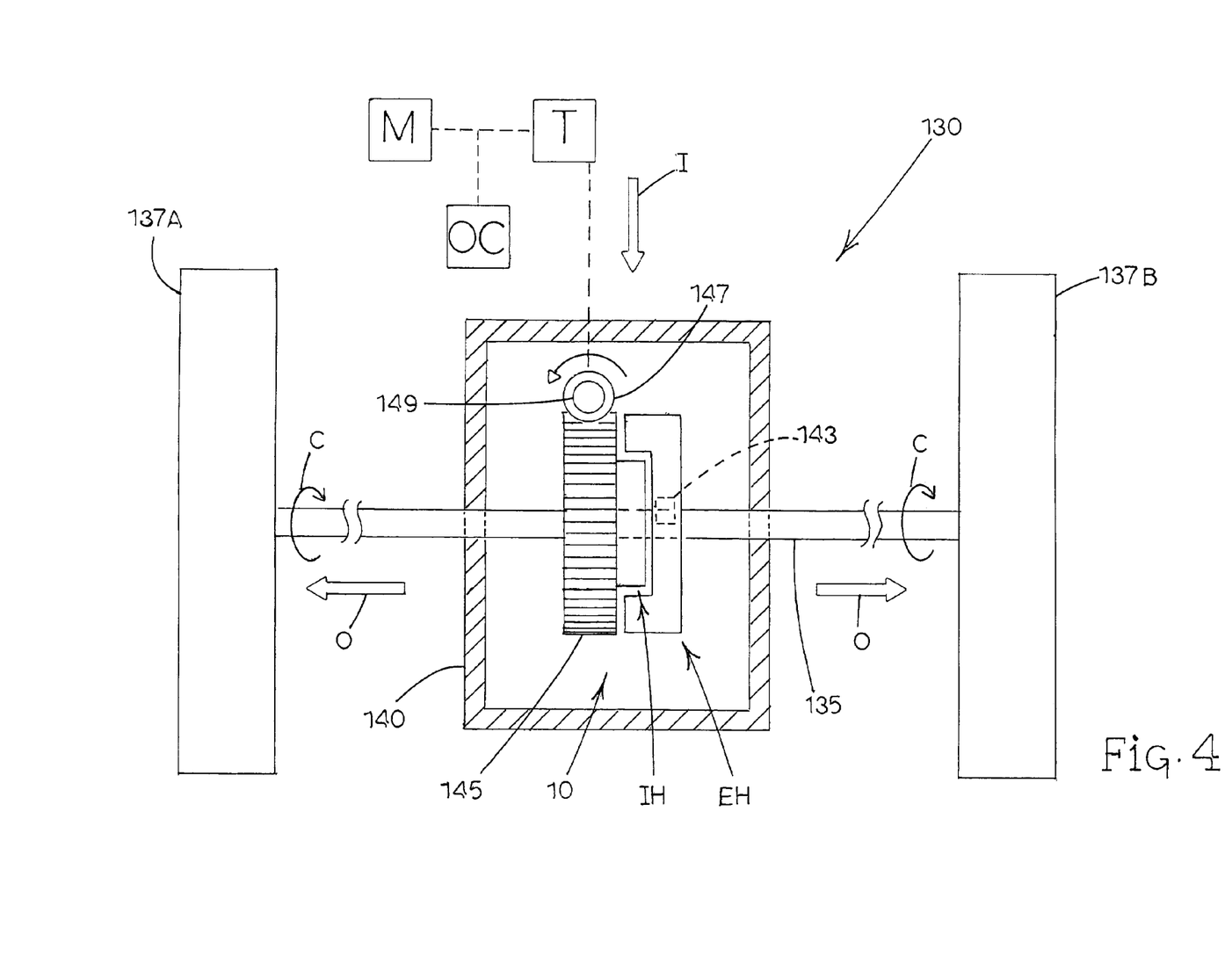
FIG. 4 is a schematic view of a drive assembly of a powered apparatus in which the coupling apparatus can be operatively installed.

Referring now to FIG. 4, coupling apparatus 10 is illustrated as being installed in an exemplary powered drive assembly or system, generally designated 130, comprising a simplified transmission assembly and running gear. The running gear comprises an axle 135 serving as the output component, and an opposing pair of wheels 137A and 137B (and, if appropriate, tires fitted to wheels) interconnected by axle 135. The transmission assembly comprises a housing 140, which can be sealed by any method known to persons skilled in the art to protect the components contained by housing 140 from exposure to dirt and other abrasive or degrading elements. Coupling apparatus 10 is confined within housing 140, wherein internal hub IH of coupling apparatus 10 rotates about axle 135 but is not directly connected to axle 135. As in previous embodiments, external hub EH rotates about axle 135 in coaxial relation to internal hub IH. However, the body of external hub EH has been extended in adjacency to one side of internal hub IH so as to be directly connected to axle 135 by any suitable fastening device as described above (e.g., key and keyway, set screw and threaded bore, and the like), and thus is able to transfer output power to axle 135 and wheels 137A and 137B.

Housing 140 of drive assembly 130 also contains a rotatable worm gear 145 that is either a separate element directly connected to internal hub IH or is formed as a part of internal hub IH during manufacture. Worm gear 145 is mated to a worm 147 that rotates with an output shaft 149 of a motor M. The input component 110 for coupling apparatus 10 as installed in drive assembly 130 can be considered to be rotatable worm gear 145 alone or in combination with worm 147, or in combination with both worm 147 and output shaft 149. It will be understood that, as an alternative to the use of worm gear 145 and worm 147, any suitable transmission elements can be used as an interface between the source of power (i.e., motor M) and coupling apparatus 10. For example, worm gear 145 and worm 147 could be replaced with a pair of bevel gears. Worm gear 145 and worm 147 are specifically illustrated as an example because, in many applications such as a lawnmower, the shaft carrying rotational power from motor M (i.e., output shaft 149) is disposed in both non-parallel and non-intersecting relation to the shaft transferring power to wheels 137A and 137B (i.e., axle 135). Worm gearing is widely employed in this type of arrangement.

Because coupling apparatus 10 is actuated by rotation of internal hub IH in the forward direction, an additional transmission component T, schematically illustrated in FIG. 4 as being interposed between motor M and output shaft 149, can be employed to disconnect internal hub IH (as well as worm gear 145, worm 147, and the illustrated section of output shaft 149) from the output of motor M, thereby allowing rotation of internal hub IH to cease and enabling bi-directional free rotation of external hub EH and wheels 137A and 137B while coupling apparatus 10 is in the de-coupled state. Depending on the particular design of powered apparatus 100, transmission component T can be either mounted inside or outside of housing 140. Transmission component T can be any suitable on/off mechanism, such as a belt-driven clutch. An operator control system OC is also schematically illustrated to enable the operator of drive assembly 130 to control motor M (e.g., motor speed) and the on/off state of transmission component T. Any suitable operator control system known to persons skilled in the art can be employed. For example, a cable can be coupled to a belt or other actuating mechanism of transmission component T and manipulated by a lever mounted to the handlebar of a lawnmower.

The operation of coupling apparatus 10 in the context of drive assembly 130 illustrated in FIG. 4 is analogous to the operations described above with reference to FIGS. 1A–3. The operator of drive assembly 130 activates coupling apparatus 10 (i.e., couples internal hub IH to external hub EH) by using operator control to engage transmission component T and connect the output of motor M to output shaft 149. The output power O supplied by motor M (represented in FIG. 4 as input power I to internal hub IH) is transmitted through output shaft 149, worm 147, and worm gear 145 to internal hub IH, causing internal hub IH to rotate in the forward direction. As described above, locking mechanism LM (see FIGS. 1A–3) in turn is actuated into seating engagement with external hub EH. As a result, output power O is transferred through locking mechanism LM, external hub EH and axle 135 to wheels 137A and 137B, causing external hub EH, axle 135, and wheels 137A and 137B to rotate in the forward direction. The rotation of wheels 137A and 137B (and tires if equipped) provides the traction needed to propel a lawnmower or other powered apparatus 100 equipped with running gear in a forward direction.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A centrifugally actuated coupling apparatus comprising:
    (a) an internal hub rotatable about an axis and comprising an outer circumferential surface and a first recess formed on the outer surface;
    (b) an annular rotatable external hub coaxially disposed about the internal hub, the external hub comprising an inner circumferential surface and at least one second recess formed on the inner surface; and
    (c) a locking element comprising a pivot end and a contact end, the pivot end pivotally retained by the internal hub at a location spaced apart from the first recess and the contact end movably contacting the first recess, wherein the contact end is pivotable radially outwardly by centrifugal force into engagement with the at least one second recess in response to rotation of the internal hub in a forward direction with respect to the external hub.

2. The coupling apparatus according to claim 1 wherein the internal hub comprises a third recess, and wherein the pivot end is retained in the third recess.

3. The coupling apparatus according to claim 2 comprising a spring contacting the pivot end and the third recess and biasing the contact end into contact with the first recess.

4. The coupling apparatus according to claim 1 comprising a rotatable input component coupled to the internal hub for transferring input power to the internal hub.

5. The coupling apparatus according to claim 4 comprising a rotatable output component coupled to the external hub for receiving output power from the external hub.

6. The coupling apparatus according to claim 1 wherein the inner surface comprises at least one cam surface, the cam surface transitions into the at least one second recess, and the contact end is adapted for movable contact with the cam surface prior to engaging the second recess in response to rotation of the internal hub in the forward direction with respect to the external hub.

7. The coupling apparatus according to claim 6 wherein the contact end is positioned between a surface of the first recess and the cam surface during rotation of the internal hub in the forward direction.

8. The coupling apparatus according to claim 1 wherein the contact end comprises opposing free-standing side surfaces joined by an outer contact surface.

9. The coupling apparatus according to claim 1 wherein the contact end is positioned between a surface of the first recess and a surface of the second recess after rotation of the internal hub in the forward direction.

10. The coupling apparatus according to claim 1 wherein the second recess comprises an arcuate inner surface adapted for at least substantially mating engagement with the contact end.

11. The coupling apparatus according to claim 1 wherein the contact end comprises a roller pin.

12. The coupling apparatus according to claim 1 wherein the internal hub comprises first and second opposing side surfaces perpendicular to the outer surface, the locking element comprises first and second opposing arms extending between the pivot end and the contact end, the first arm is adjacent to the first side surface and the second arm is adjacent to the second side surface.

13. The coupling apparatus according to claim 12 wherein the locking element comprises a front arm joining at least one of the first and second arms, and the contact end comprises a roller pin rotatably supported by the front arm.

14. The coupling apparatus according to claim 1 comprising a spring contacting the pivot end and the internal hub and biasing the contact end into contact with the first recess.

15. A centrifugally actuated coupling apparatus comprising:
    (a) an internal hub rotatable about an axis and comprising an outer circumferential surface and a first recess formed on the outer surface;
    (b) an annular rotatable external hub coaxially disposed about the internal hub, the external hub comprising an inner circumferential surface and at least one second recess formed on the inner surface; and
    (c) a locking element comprising a pivot end, a locking element axis and a contact element rotatable about the locking element axis, the pivot end pivotally retained by the internal hub at a location spaced apart from the first recess and the contact element movably contacting the first recess, wherein the contact element is pivotable radially outwardly into engagement with the at least one second recess in response to rotation of the internal hub in a forward direction with respect to the external hub.

16. The coupling apparatus according to claim 15 wherein the internal hub comprises a third recess, and wherein the pivot end is retained in the third recess.

17. A centrifugally actuated coupling apparatus comprising:
    (a) an internal hub rotatable about an axis and comprising an outer circumferential surface, a first recess formed on the outer surface, and a pivot section spaced apart from the first recess;
    (b) an annular rotatable external hub coaxially disposed about the internal hub, the external hub comprising an inner circumferential surface and at least one second recess formed on the inner surface; and
    (c) a locking element comprising a contact end and a pivot end, the contact end movably contacting the first recess and the pivot end pivotally retained by the internal hub at the pivot section, wherein the contact end is pivotable radially outwardly into engagement with the at least one second recess in response to rotation of the internal hub in a forward direction with respect to the external hub.

18. The coupling apparatus according to claim 17 wherein the contact end comprises a contact end axis and a contact element rotatable about the contact end axis.

19. A centrifugally actuated coupling apparatus comprising:
    (a) an internal hub rotatable about an axis and comprising an outer circumferential surface and a first recess formed on the outer surface;
    (b) an annular rotatable external hub coaxially disposed about the internal hub, the external hub comprising an inner circumferential surface and at least one second recess formed on the inner surface; and
    (c) a locking element comprising a pivot end pivotally retained by the internal hub at a location spaced apart from the first recess and a contact end, the contact end comprising opposing free-standing side surfaces joined by an outer contact surface movably contacting the first recess, wherein the outer contact surface is pivotable radially outwardly into engagement with the at least one second recess in response to rotation of the internal hub in a forward direction with respect to the external hub.

20. The coupling apparatus according to claim 19 wherein the internal hub comprises a third recess, and wherein the pivot end is retained in the third recess.

21. The coupling apparatus according to claim 19 wherein the contact end comprises a contact end axis and the outer contact surface is rotatable about the contact end axis.

22. A centrifugally actuated coupling apparatus adapted to enable selective free rotation and torque transmission, the coupling apparatus comprising:
    (a) an internal hub rotatable about an axis in a forward direction and comprising an outer circumferential surface and a first recess formed on the outer surface;
    (b) an annular external hub coaxially disposed about the internal hub and rotatable about the axis, the external hub comprising an inner circumferential surface and a plurality of circumferentially spaced second recesses formed on the inner surface; and
    (c) a locking element comprising a pivot end and a contact end, the pivot end pivotally retained by the internal hub at a location spaced apart from the first recess and the contact end radially pivotable from a de-coupled position to a coupled position in response to rotation of the internal hub in the forward direction with respect to the external hub, wherein at the de-coupled position the contact end contacts the first recess and permits the external hub to rotate in the forward direction and in a reverse direction with respect to the internal hub, and pivoting of the contact end to the coupled position rolls the contact end into engagement with one of the second recesses to enable the internal hub to drive the external hub in the forward direction.

23. The coupling apparatus according to claim 22 wherein the internal hub comprises a third recess, and wherein the pivot end is retained in the third recess.

24. The coupling apparatus according to claim 22 wherein the inner surface comprises a plurality of circumferentially spaced cam surfaces, each cam surface transitions into a respective second recess, and the contact end is adapted for movable contact with one of the cam surfaces prior to engaging its respective second recess in response to rotation of the internal hub in the forward direction with respect to the external hub.

25. The coupling apparatus according to claim 24 wherein the contact end is positioned between a surface of the first recess and one of the cam surfaces during rotation of the internal hub in the forward direction.

26. The coupling apparatus according to claim 22 wherein the contact end comprises opposing free-standing side surfaces joined by an outer contact surface.

27. The coupling apparatus according to claim 22 wherein the contact end is positioned between a surface of the first recess and a surface of one of the second recesses after rotation of the internal hub in the forward direction.

28. The coupling apparatus according to claim 22 wherein the contact end comprises a roller pin.

29. The coupling apparatus according to claim 22 comprising a spring contacting the pivot end and the internal hub and biasing the contact end into contact with the first recess.

30. A method for selectively transmitting torque from a first rotatable member to a second rotatable member, comprising the steps of:
    (a) providing a coupling device comprising the first rotatable member, the second rotatable member disposed in coaxial relation to the first rotatable member, and a catch mechanism, wherein the first rotatable member comprises an outer circumferential surface and a first recess formed on the outer surface, the second rotatable member comprises an inner circumferential surface and at least one second recess formed on the inner surface, and the catch mechanism is pivotally retained by the first rotatable member at a location spaced apart from the first recess and comprises a contact end movable along the first recess during pivoting of the catch mechanism; and
    (b) locking the first rotatable member into mechanical communication with the second rotatable member by rotating the first rotatable member in a first direction to pivot the contact end radially outwardly into seating engagement with a second recess, whereby further rotation of the first rotatable member in the first direction rotates the second rotatable member in the first direction.

31. The method according to claim 30 wherein the second rotatable member is stationary prior to rotating the first rotatable member in the first direction.

32. The method according to claim 30 wherein the second rotatable member is rotating in the first direction at a speed proportionately less than the input speed of the first rotatable member to enable the contact end of the catch mechanism to engage the second recess in response to rotation of the first rotatable member in the first direction.

33. The method according to claim 30 wherein the second rotatable member is rotating in a second direction reverse to the first direction prior to rotating the first rotatable member in the first direction.

34. The method according to claim 30 wherein rotation of the first rotatable member in the first direction drives the contact end of the catch mechanism into contact with the inner surface of the second rotatable member and causes the contact end to move along the inner surface and into engagement with the second recess.

35. The method according to claim 30 wherein the contact end of the catch mechanism maintains contact with the first recess while engaging the second recess to assist in retaining the contact end in seating engagement with the second recess during rotation of the first rotatable member in the first direction.

36. A method for selectively transmitting torque from a first rotatable member to a second rotatable member coaxially disposed about the first rotatable member, comprising the steps of:
    (a) rotating the first rotatable member in a first direction to produce centrifugal force;
    (b) permitting centrifugal force to cause a catch mechanism connected to the first rotatable member to pivot at a pivot location spaced apart from a first recess of the catch mechanism to move a contact end of the catch mechanism from the first recess in a radially outward direction; and
    (c) seating the catch mechanism in a second recess of the second rotatable member, whereby further rotation of the first rotatable member rotates the second rotatable member in the first direction.

37. The method according to claim 36 wherein the step of pivoting the catch mechanism comprises rolling the catch mechanism along an outer surface of the first rotatable member.

38. The method according to claim 37 comprising the step of retaining the catch mechanism in the second recess by maintaining contact between the catch mechanism and both the outer surface and the second recess.

39. A centrifugally actuated coupling apparatus comprising:
    (a) an internal hub rotatable about an axis and comprising an outer circumferential surface and a first recess formed on the outer surface;
    (b) an annular rotatable external hub coaxially disposed about the internal hub, the external hub comprising an inner circumferential surface and at least one second recess formed on the inner surface;
    (c) a locking element comprising a pivot end and a contact end, the pivot end pivotally retained by the internal hub and the contact end movably contacting the first recess, wherein the contact end is pivotable radially outwardly by centrifugal force into engagement with the at least one second recess in response to rotation of the internal hub in a forward direction with respect to the external hub;
    (d) wherein the internal hub comprises a third recess, and wherein the pivot end of the locking element is retained in the third recess; and
    (e) a spring contacting the pivot end and the third recess and biasing the contact end of the locking element into contact with the first recess.

40. A centrifugally actuated coupling apparatus comprising:
    (a) an internal hub rotatable about an axis and comprising an outer circumferential surface and a first recess formed on the outer surface;
    (b) an annular rotatable external hub coaxially disposed about the internal hub, the external hub comprising an inner circumferential surface and at least one second recess formed on the inner surface;
    (c) a locking element comprising a pivot end and a contact end, the pivot end pivotally retained by the internal hub and the contact end movably contacting the first recess, wherein the contact end is pivotable radially outwardly by centrifugal force into engagement with the at least one second recess in response to rotation of the internal hub in a forward direction with respect to the external hub; and
    (d) wherein the internal hub comprises first and second opposing side surfaces perpendicular to the outer surface, the locking element comprises first and second opposing arms extending between the pivot end and the contact end, the first arm is adjacent to the first side surface and the second arm is adjacent to the second side surface.

41. A centrifugally actuated coupling apparatus comprising:
    (a) an internal hub rotatable about an axis and comprising an outer circumferential surface and a first recess formed on the outer surface;
    (b) an annular rotatable external hub coaxially disposed about the internal hub, the external hub comprising an inner circumferential surface and at least one second recess formed on the inner surface;
    (c) a locking element comprising a pivot end and a contact end, the pivot end pivotally retained by the internal hub and the contact end movably contacting the first recess, wherein the contact end is pivotable radially outwardly by centrifugal force into engagement with the at least one second recess in response to rotation of the internal hub in a forward direction with respect to the external hub;
    (d) wherein the internal hub comprises first and second opposing side surfaces perpendicular to the outer surface, the locking element comprises first and second opposing arms extending between the pivot end and the contact end, the first arm is adjacent to the first side surface and the second arm is adjacent to the second side surface; and
    (e) wherein the locking element comprises a front arm joining at least one of the first and second arms, and the contact end comprises a roller pin rotatably supported by the front arm.

* * * * *